Nov. 13, 1934.    G. TOMPKINS    1,980,890

READY-TO-SOLDER WIRE

Filed Jan. 5, 1934

WITNESSES

INVENTOR
George Tompkins
BY
Munn, Anderson, Stanley, Foster & Liddy
ATTORNEYS

Patented Nov. 13, 1934

1,980,890

UNITED STATES PATENT OFFICE 1,980,890

READY-TO-SOLDER WIRE

George Tompkins, Wollaston, Mass., assignor of one-half to Burt M. McConnell, New York, N. Y.

Application January 5, 1934, Serial No. 705,412

1 Claim. (Cl. 29—182)

This invention relates to ready-to-solder wire. This title is advisedly employed because the wire has physically associated therewith solder and a flux, so that when heat is applied to the wire through the medium of a soldering iron or the like the solder will be melted and the wire will be soldered to a part to which it is to be connected.

I am aware of the fact that heretofore solder and a flux have been combined in a single wire, usually with the solder in tubular form and the flux, which may be rosin or other suitable material, located inside of the tubular solder wire.

In employing this solder wire and flux to solder a wire to a coupling, terminal or other object, the operator really needs three hands, one hand to hold the wire in proper relation to the coupling or terminal, a second hand to hold the soldering wire, and a third hand to manipulate the iron. However, it is possible for a dexterous person to manipulate the three elements in forming a proper soldering operation, but there is always a possibility of making a poor soldering joint; in any event, it takes considerable time and care to make a perfect job.

With my improved ready-to-solder wire I physically connect in a single member a wire to be soldered, soldering material and a flux, so that when this ready-to-solder wire is placed in position for soldering it is simply necessary to bring a soldering iron into physical contact therewith and a perfect soldering job can be easily made.

My improved ready-to-solder wire may take many different forms and has many features of advantage over the prior art, and consists in certain novel features of construction and combinations and arrangements of parts as will be more fully hereinafter described and pointed out in the claim.

In the accompanying drawing,—

Figure 1:
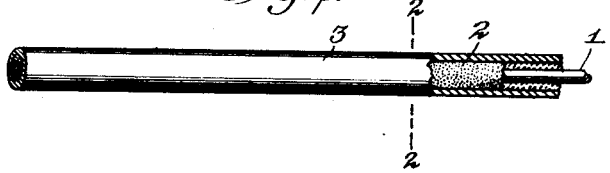
Figure 1 is a view mainly in elevation but partly in section, illustrating one form of my invention.
Figure 2:
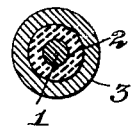
Figure 2 is an enlarged view in transverse section on the line 2/2 of Figure 1.
Figure 7:
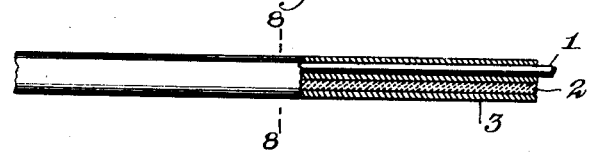
Figure 8:
Figure 9:
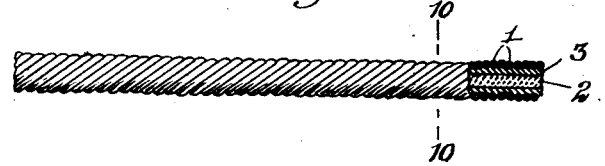
Figure 10:

Figures 7 and 8 are views similar to Figures 1 and 2, illustrating another modification; and Figures 9 and 10 are views similar to Figures 1 and 2 illustrating another modification.

All figures of the drawing are greatly exaggerated for clearness of illustration although, of course, the invention is in no way limited to the relative sizes and proportions of the elements constituting the wire. In view of the fact that I employ the term "wire" to define the article as a whole, to avoid misunderstanding and to prevent constant repetition I shall hereinafter refer to the element 1 as a conductor, or electric conductor, the element 2 as flux or rosin, and the element 3 as solder. It is, of course, to be understood that the element 1 may constitute a wire which is not an electric conductor, as the invention is broad enough to include any form of wire although the invention has a very wide application of use in connection with electric conductors and particularly in the soldering of connections in radio-receiving sets where a large number of soldered connections must be made.

The element 1 may constitute an ordinary copper wire or electric conductor, and in the form of the invention illustrated in Figures 1 and 2 of the drawing this conductor is surrounded or enclosed in the element 2, which is the flux or rosin, and an outer covering or tubular wire 3 of solder encloses and surrounds both the flux 2 and the conductor 1.

Figure 3:
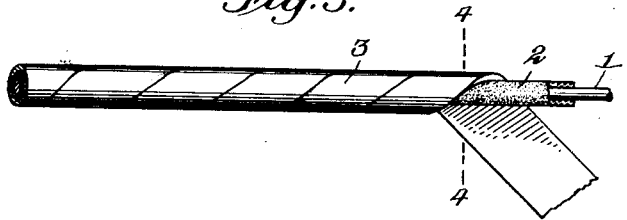
Figures 3 and 4 are views similar to Figures 1 and 2, illustrating a modification.
Figure 4:
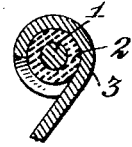

In the form of the invention illustrated in Figures 3 and 4 of the drawing the conductor 1 is enclosed in the flux 2, and the solder 3 is spirally wound around the flux enclosing both the flux and the conductor.

Figure 5:
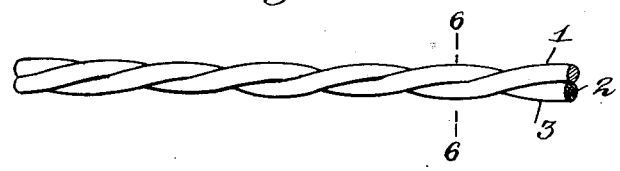
Figures 5 and 6 are views similar to Figures 1 and 2, illustrating another modification.
Figure 6:

In the form of the invention illustrated in Figures 5 and 6 of the drawing, the flux 2 is enclosed in a tubular wire 3 of solder and the conductor 1 constitutes a separate wire, the wires 1 and 3 being twisted together.

In the modification illustrated in Figures 7 and 8 of the drawing the solder member 3 has two longitudinal bores in which the conductor 1 and the flux 2 are located.

In the modification illustrated in Figures 9 and 10 of the drawing, the flux 2 is enclosed in a tubular solder wire 3, and the electric conductor 1 is in the form of strands of wire wound around the solder 2 and 3.

It is perfectly apparent that the incorporation of these three elements, namely, the wire or conductor with solder, and a flux, may be formed in various other ways than those illustrated, and I desire to cover the idea broadly of the physical association of these three elements in a single member so that when heat is applied to said member the soldering operation can be carried out. It is also to be distinctly understood that it is not necessary in many cases to have the soldering element and the flux element the entire length of the wire or conductor, but this solder element and flux element may be at the end of the wire or at any other point desired on the wire.

The underlying principle of my improved ready-to-solder wire is the employment of metals with melting points so widely separated that one of the elements of the wire may be melted by a soldering iron or similar means without melting the other element. More specifically, where copper wire and solder are employed, together with a flux, the application of the soldering iron will cause the solder to melt and the flux to function in connection therewith to act as a securing means for the copper wire.

While I have illustrated several embodiments of my invention it is obvious that various slight changes may be made in the general form and arrangement of parts without departing from my invention, and hence I do not limit myself to the precise details set forth but consider myself at liberty to make such changes and alterations as fairly fall within the spirit and scope of the claim.

What I claim is:

A device of the character described, including a tubular wire of solder, flux enclosed in the tube of solder, and a conductor located in the flux.

GEORGE TOMPKINS.